2,866,733
Patented Dec. 30, 1958

2,866,733

MUCOSAL-ANESTHETIC COMPOSITIONS CONTAINING POLYCARBOXYLIC ACID SALTS OF N - DIETHYLAMINOETHYL - α - PROPYL-CINNAMAMIDE

William A. Lott, Maplewood, and Edward J. Pribyl, Metuchen, N. J., assignors to Olin Mathieson Chemical Corporation, New York, N. Y., a corporation of Virginia No Drawing. Application October 2, 1956
Serial No. 613,373

6 Claims. (Cl. 167—52)

This invention relates to mucosal anesthetic compositions and has for its objects: (1) the provision of non-irritating compositions for topical administration to the mucous membrane, containing as the active ingredient a polybasic non-toxic organic acid salt of N-diethylaminoethyl-α-propyl-cinnamamide; and (2) the provision of certain new chemical compounds, the polybasic non-toxic organic acid salts of N-diethylaminoethyl-α-propyl-cinnamamide, utilizable in such compositions.

When using local anesthetics for mucous membrane anesthesia, the acidity of the active ingredient (in the form of an inorganic salt) generally causes irritation of the mucous membranes, resulting in a stinging sensation. This is due to the sensitivity of the trachea, glottis and epiglottis to changes in pH. Attempts to neutralize this acidity by addition of a base to the aqueous solution in which form the local anesthetics are usually applied often results either merely in the precipitation of the active ingredient, as a base, from the solution, or in excessively alkalinizing the solution, due to the sensitivity of the active ingredient to bases, thereby yielding an irritating formulation.

We have unexpectedly found, however, that when a polybasic non-toxic organic acid salt of N-diethylaminoethyl-α-propyl-cinnamamide is employed as the active component in an aqueous spray or other suitable formulation for mucosal anesthesia, the salt, unlike the simple inorganic salts (e. g., hydrochloride) of N-diethylaminoethyl-α-propyl-cinnamamide, can be successfully neutralized (i. e., adjusted to a pH in the range of about 6.5 to about 7.2) by addition of a base, such as an alkali, without precipitating the N-diethylaminoethyl-α-propyl-cinnamamide from solution or increasing the pH of the solution above the tolerable upper limit of 7.2; further, the resultant "neutral" solution is non-irritating and effective as an anesthetic when administered as a spray to mucous membranes in bronchoscopy, for example.

The compositions of this invention, therefore, comprise an aqueous substantially neutral solution of a polybasic non-toxic organic acid salt of N-diethylaminoethyl-α-propyl-cinnamamide. [By the term "substantially neutral" is meant a solution in the pH range of about 6.5 to about 7.2.]

Among the suitable polybasic non-toxic organic acids utilizable in the formation of the salts of this invention may be mentioned the dibasic non-toxic organic acids, such as the lower alkanedioic acids (e. g., malonic, succinic and glutaric acids), the lower hydroxyalkanedioic acids (e. g., malic acid), the lower dihydroxy-alkanedioic acids (e. g., tartaric acid), the lower alkanetrioic acids (e. g., tricarballylic acid), and the lower hydroxyalkanetrioic acids (e. g., citric acid). To prepare the active ingredient of this invention, N-diethylaminoethyl-α-propyl-cinnamamide hydrochloride [J. Amer. Pharm. Assoc., 28, 499 (1939)] is converted to the free base, as by treatment with a basic material (e. g., potassium carbonate); and the free base, thus formed, is treated with one equivalent of a polybasic non-toxic organic acid.

When utilized for mucous membrane anesthesia, the active ingredient of this invention is best incorporated in an aqueous spray. This spray is prepared by dissolving the active ingredient in water and neutralizing to a pH of about 6.5 to about 7.2 (preferably 6.7 to 7.1) by treatment with a base, such as an alkali (e. g., sodium hydroxide). We have found that when so employed, effective anesthesia is obtained with a concentration of active ingredient as low as 0.5% (w./v.). A preferred concentration of active ingredient, however, is one in the range of about 1% to about 5% of N-diethylaminoethyl-α-propyl-cinnamamide. Aside from the water used to prepare the spray and the base used to neutralize the solution (i. e., a solution in a pH range of about 6.5 to about 7.2), it is advantageous to incorporate a preservative such as methylparaben or propylparaben (or both) into the solution.

The following examples illustrate the invention, the first three examples disclosing suitable methods for preparing the active ingredients of this invention and the remaining example illustrating a suitable formulation within the scope of this invention:

EXAMPLE 1

*Preparation of N-diethylaminoethyl-α-propyl-cinnamamide monocitrate*

15 g. of N-diethylaminoethyl-α-propyl-cinnamamide hydrochloride is dissolved in 100 ml. of water, made alkaline with potassium carbonate and is then extracted with 2 x 100 ml. of ether. The extracts are combined, dried over magnesium sulfate and filtered. After removal of the ether, there remains 13 g. of the cinnamamide base. This material is dissolved in 50 ml. of ethyl alcohol and 9 g. of anhydrous citric acid in 50 ml. of ethyl alcohol is added. The solution is refluxed for about 1 hour when the alcohol is removed by distillation. The residue is recrystallized from 400 ml. methyl ethyl ketone to give a white crystalline material melting at about 113–114° C.

EXAMPLE 2

*Preparation of N-diethylaminoethyl-α-propyl-cinnamamide monotartrate*

13 g. of N-diethylaminoethyl-α-propyl-cinnamamide base (prepared as disclosed in Example 1) is dissolved in 50 ml. of ethyl alcohol, and 6.8 g. of anhydrous tartaric acid in 120 ml. of ethyl alcohol is added. The solution is refluxed for about one hour when the alcohol is removed by distillation. The residue is recrystallized from 400 ml. of methyl ethyl ketone to give a crystalline material.

EXAMPLE 3

*Preparation of N-diethylaminoethyl-α-propyl-cinnamamide monosuccinate*

13 g. of N-diethylaminoethyl-α-propyl-cinnamamide base (prepared as disclosed in Example 1) is dissolved in 50 ml. of ethyl alcohol, and 5.2 g. of anhydrous succinic acid in 100 ml. of ethyl alcohol is added. The solution is refluxed for about one hour after which the alcohol is removed by distillation. The residue is recrystallized from 400 ml. of methyl ethyl ketone to give a crystalline material.

The neutral aqueous sprays of this invention can be prepared as illustrated in the following example:

EXAMPLE 4

To prepare an oral spray, there is intermixed:

| | Grams |
|---|---|
| N-diethylaminoethyl-α-propyl-cinnamamide monocitrate | 2 |
| Sodium hydroxide | 0.34 |
| Methylparaben | 0.1 |
| Propylparaben | 0.02 |
| Distilled water to make 100 ml. | |

The resultant solution has a pH of 6.7.

Similarly, solutions can be prepared using the monotartrate or monosuccinate salts of N-diethylaminoethyl-α-propyl-cinnamamide instead of the monocitrate salt; and other basic materials, such as disodium phosphate and sodium carbonate, can be used instead of sodium hydroxide.

The advantages of the compositions of this invention over those salts of simple inorganic acids are evident from the following table, wherein attempts were made to neutralize 0.001 mole solutions of the hydrochloride salt (HCl) and the monocitrate salt (citrate) of N-diethylaminoethyl-α-propyl-cinnamamide with (ml.) milliliters of 0.1 sodium hydroxide:

| Ml. of 0.1 N sodium hydroxide added | Resultant pH of— | |
|---|---|---|
| | HCl | Citrate |
| 0 | 4 | 4 |
| 0.1 | 4.4 | 4 |
| 0.2 | 5.2 | 4 |
| 0.3 | 6 | 4 |
| 0.4 | 7 | 4 |
| 0.5 | 7.5 | 4 |
| 1 | 8 | 4.1 |
| 17 | >12 | 6.4 |
| 17.5 | >12 | 6.5 |
| 18 | >12 | 6.6 |
| 19 | >12 | 7.0 |
| 19.5 | >12 | 7.2 |
| 20 | >12 | 7.6 |

Hence, it can be seen that whereas a spread of the order of 0.2 ml. of 0.1 N sodium hydroxide changes the pH of a solution of hydrochloride salt from excessively acidic to excessively basic, a spread of the order of 2.0 (i. e., from 17.5 to 19.5) ml. of 0.1 N sodium hydroxide can be added without altering the pH of the citrate salt so that it falls outside the utilizable range.

The invention may be otherwise variously embodied within the scope of the appended claims.

We claim:
1. The polybasic non-toxic organic acid salts of N-diethylaminoethyl-α-propyl-cinnamamide.
2. N-diethylaminoethyl-α-propyl-cinnamamide monocitrate.
3. A mucosal anesthetic composition comprising a substantially neutral aqueous solution of a polybasic non-toxic organic acid salt of N-diethylaminoethyl-α-propyl-cinnamamide.
4. The composition of claim 3, wherein the salt is N-diethylaminoethyl-α-propyl-cinnamamide monocitrate.
5. The composition of claim 4, wherein the salt is present in a concentration of at least about 0.5%.
6. The composition of claim 4, wherein the salt is present in a concentration in the range of about 1% to about 5%.

References Cited in the file of this patent

UNITED STATES PATENTS

| 2,139,687 | Lott | Dec. 13, 1938 |
| 2,766,173 | Ziegler et al. | Oct. 9, 1956 |